Jan. 9, 1962     H. L. SMITH, JR     3,016,100

AUTOMATIC BATCH WEIGHING APPARATUS

Filed Feb. 25, 1957     7 Sheets-Sheet 1

INVENTOR
*Horace L. Smith, Jr.,*

BY

ATTORNEY

Jan. 9, 1962   H. L. SMITH, JR   3,016,100
AUTOMATIC BATCH WEIGHING APPARATUS
Filed Feb. 25, 1957   7 Sheets-Sheet 2

INVENTOR
Horace L. Smith, Jr.,
BY
*J. B. Collings*
ATTORNEY

Jan. 9, 1962 H. L. SMITH, JR 3,016,100
AUTOMATIC BATCH WEIGHING APPARATUS
Filed Feb. 25, 1957 7 Sheets-Sheet 3

INVENTOR
*Horace L. Smith, Jr.,*

BY

*J. B. Collings*
ATTORNEY

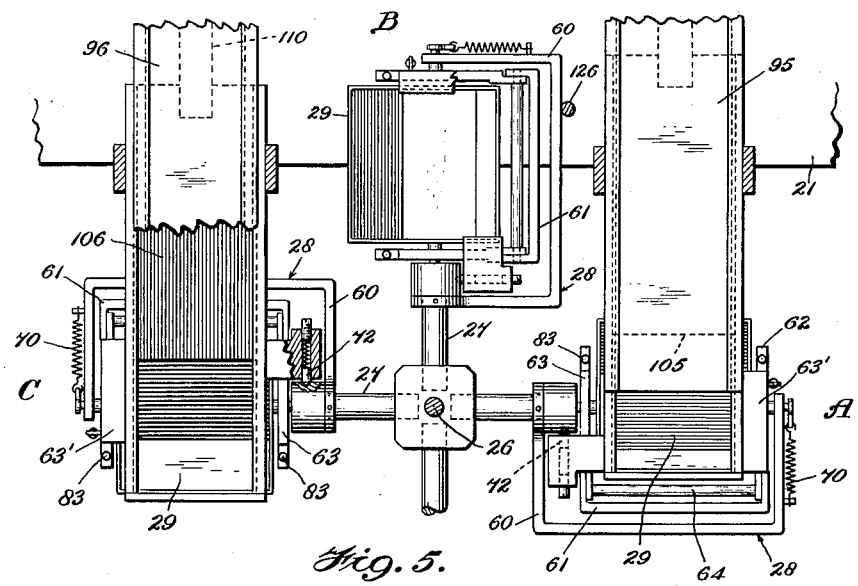
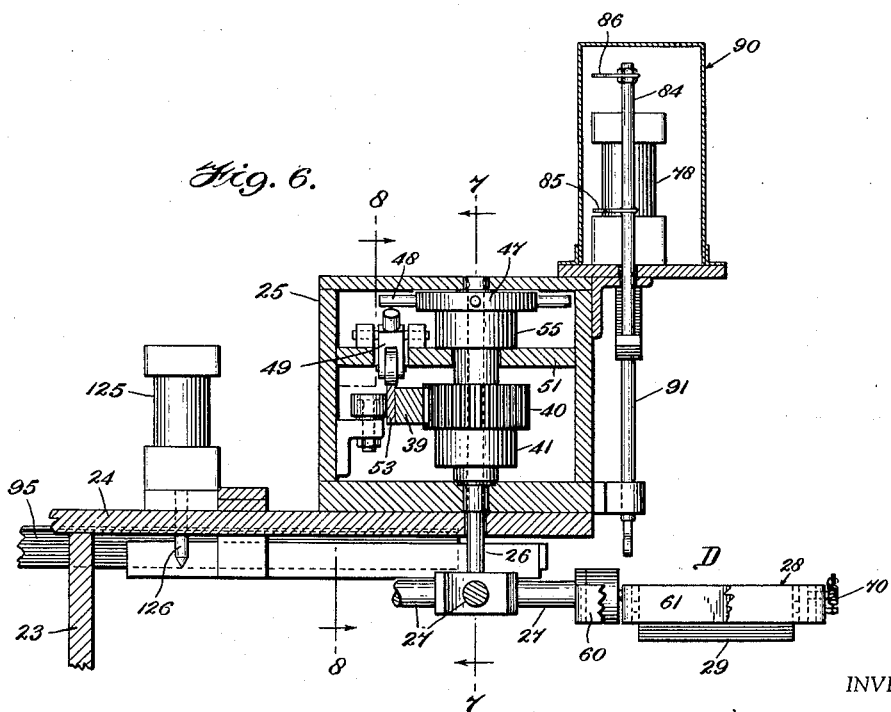

Jan. 9, 1962 H. L. SMITH, JR 3,016,100
AUTOMATIC BATCH WEIGHING APPARATUS
Filed Feb. 25, 1957 7 Sheets-Sheet 5

INVENTOR
*Horace L. Smith, Jr.*,

BY

ATTORNEY

Jan. 9, 1962  H. L. SMITH, JR  3,016,100
AUTOMATIC BATCH WEIGHING APPARATUS
Filed Feb. 25, 1957  7 Sheets-Sheet 6
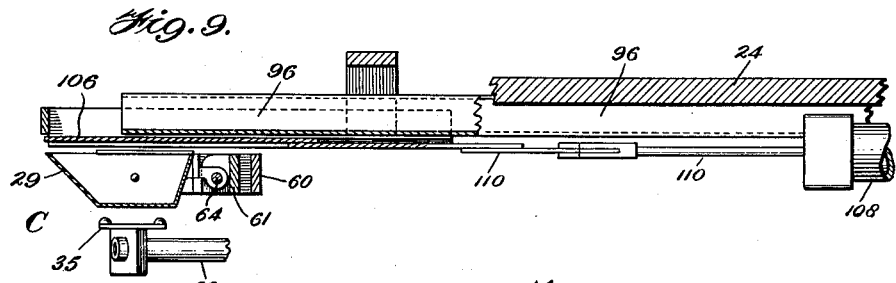
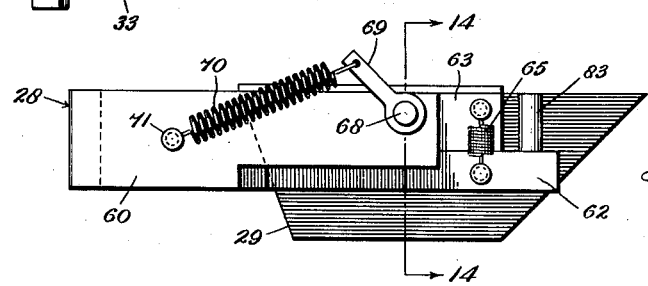
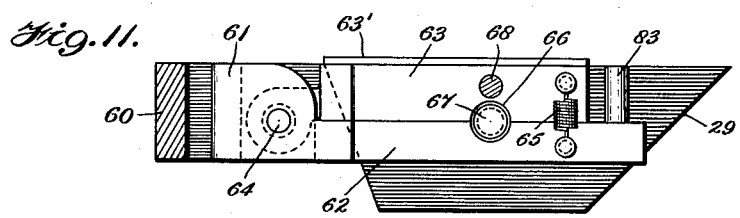
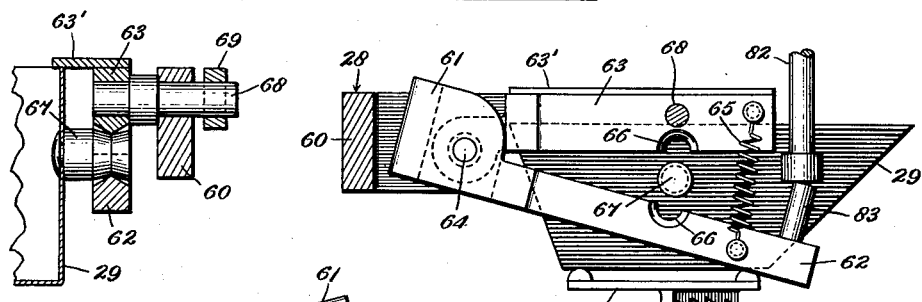
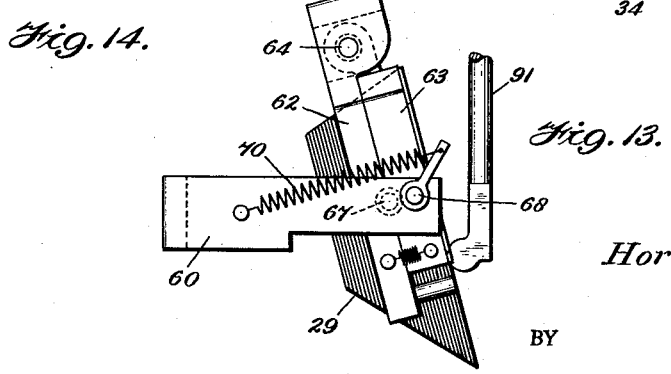
INVENTOR
*Horace L. Smith, Jr.,*
BY
ATTORNEY INVENTOR
Horace L. Smith, Jr.,
BY
ATTORNEY ns specification, in which there is illustrated one exemplification of the invention:

United States Patent Office
3,016,100
Patented Jan. 9, 1962

3,016,100
AUTOMATIC BATCH WEIGHING APPARATUS
Horace L. Smith, Jr., Richmond, Va., assignor, by mesne assignments, to Hupp Corporation, Cleveland, Ohio, a corporation of Virginia
Filed Feb. 25, 1957, Ser. No. 641,913
17 Claims. (Cl. 177—52)

This invention relates to automatic weighing apparatus and has for its primary object the provision of improved mechanism of this character that is adapted to uniformly deliver accurately weighed batches of solid materials or products which comprise discrete pieces or components of various sizes. By way of illustration but not limitation, the present apparatus may be advantageously employed to rapidly provide, for appropriate packaging, extremely accurately weighed batches of products or materials which embody particles, grains, flakes and agglomerations or lumps thereof, such as food products, laundry products, chemicals, medicines, etc.

In batching such materials or products, especially those which contain pieces or agglomerations of considerable size, close accuracy in the batch weights is difficult to achieve or maintain if the material is indiscriminately supplied to the weighing mechanism. Under such circumstances, as the batch being weighed nears the predetermined value at which the feed will be interrupted, one or more relatively large pieces or lumps frequently will be added to the batch whereby the total weight thereof will exceed that desired. The overage in each batch may not be great in relation to the intended batch weight but where thousands of packages are prepared each day, the gross excess may become of considerable importance, especially if the materials be of an expensive character.

The present apparatus is designed to substantially eliminate the possibility of such overage and enable the rapid production of batches of this type of material or products which are uniformly of exactly the weight desired. To this end the apparatus essentially comprises a plurality of independent weighing mechanisms or scales of appropriate sensitivity, arranged in suitably spaced relation; a plurality of batch receptacles mounted for serial movement to and temporary engagement with each of said weighing mechanisms; means whereby a major portion of a batch may be supplied to each receptacle while it is engaged with one of said mechanisms, such batch portion being composed of only the larger components, or of both the larger and smaller components, of the material; means for transferring the partly filled receptacle to another of the weighing mechanisms; means for there supplying the remainder of the batch to the receptacle, such portion being composed of only the smaller constituents of the material; and means whereby the completed batch may be discharged from the receptacle prior to the return of the latter to the initial weighing mechanism for the reception of another batch.

The respective weighing mechanisms control the cut-off devices which interrupt the material feeds to the receptacles and they are suitably biased to perform that function the instant the predetermined initial portion and the full batch have been deposited in the receptacles. By using only the smaller material components in completing the batches, extreme accuracy as to the full batch weight may be had, as complete cut-off of such components may be effected simultaneously with the attainment of such weight of material in the receptacle, without the possibility of the deposit of lumps or other large components which would result in an overage.

The apparatus also includes subsidiary features, which will appear as the description proceeds.

In the accompanying drawings constituting a part of this specification, in which there is illustrated one exemplification of the invention:

FIG. 5 is a view similar to FIG. 4 but on a slightly larger scale, taken approximately on the plane indicated by the line 5—5 in FIG. 3 looking down;

FIG. 6 is a vertical sectional view, also on a larger scale, taken approximately on the plane indicated by the line 6—6 in FIG. 3, looking in the direction of the arrows;

FIG. 9 is a partial vertical sectional view on an enlarged scale, taken approximately on the planes indicated by the line 9—9 in FIG. 2, looking in the direction of the arrows;

FIG. 10 is an enlarged side elevational view of one of the batch receptacles and the supporting members therefor, the parts being shown in the positions they normally occupy;

FIG. 11 is a view similar to FIG. 10 but with a portion of the main supporting element cut away;

FIG. 12 is a view similar to FIG. 11 but illustrating the parts in the positions they assume when the receptacle is temporarily released for engagement with the supporting member of the weighing mechanism;

FIG. 13 is a view similar to FIG. 10 but showing the parts in the positions they assume when the receptacle is tilted to effect discharge of a completed batch;

FIG. 14 is an enlarged fragmentary cross sectional view on the plane indicated by the line 14—14 in FIG. 10, looking in the direction of the arrows;

Figure 1:
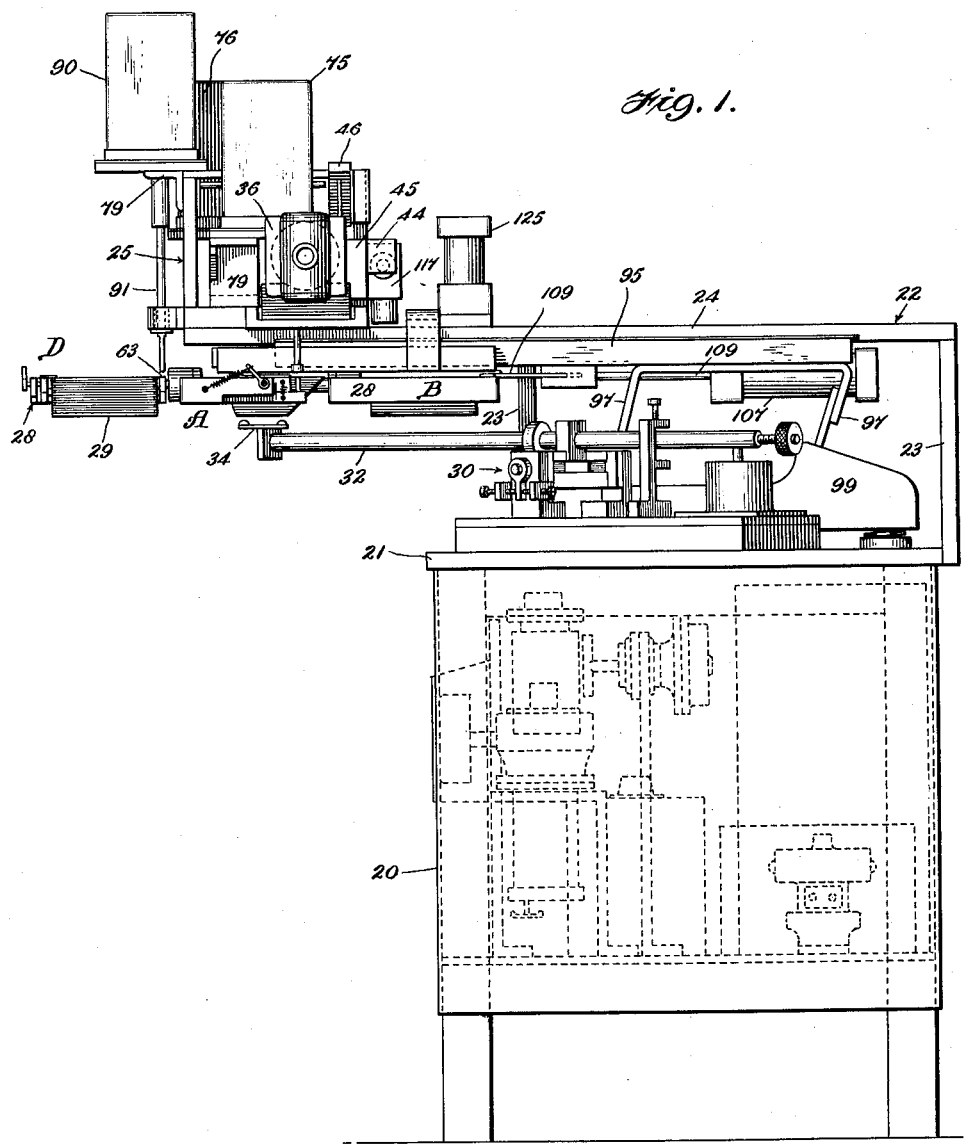
FIGURE 1 is an end elevational view thereof.

Referring to the said drawings in greater detail, as here shown the apparatus comprises a cabinet structure 20 that serves to house certain of the control devices for the mechanism (indicated in dotted lines), which devices are of conventional constructions which constitute no part of the invention. To the top member 21 of said cabinet there is attached a main supporting framework 22 comprising upright members 23 and a horizontal member 24 which overhangs the front of the cabinet, as shown in FIG. 1. Superposed on the forward end portion of said member 24 is an auxiliary frame structure 25 of open rectangular formation and in which is rotatably journaled a vertical shaft 26 the lower portion of which extends below the frame member 24 and rigidly carries a plurality of horizontal radially extending arms 27, here shown as four in number. Each of these arms has rigidly attached to its outward end a carrier assembly 28 for the batch receptacles 29, which will be hereafter more fully described.

Figure 2:
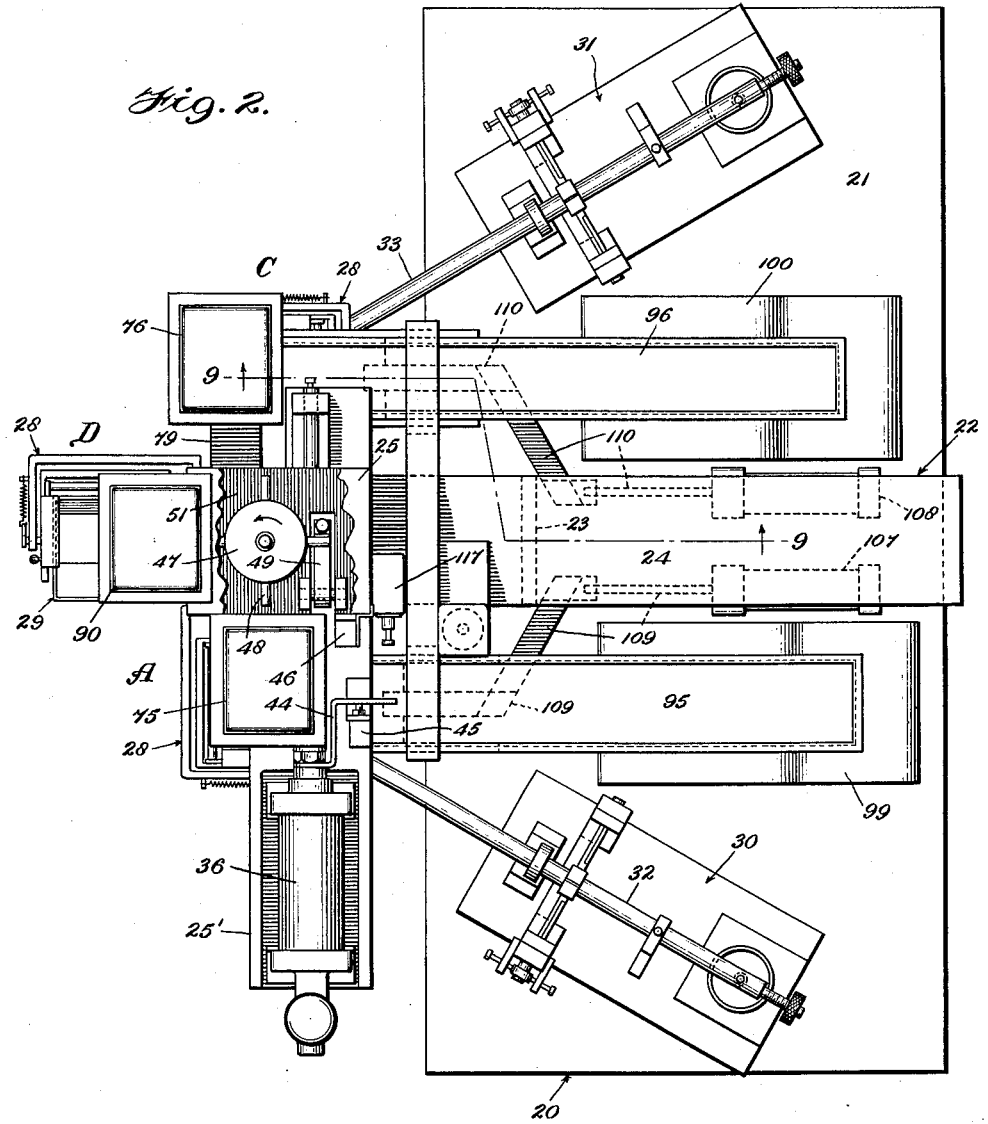
FIG. 2 is a top plan view, partly broken away, of the parts shown in FIG. 1.
Figure 3:
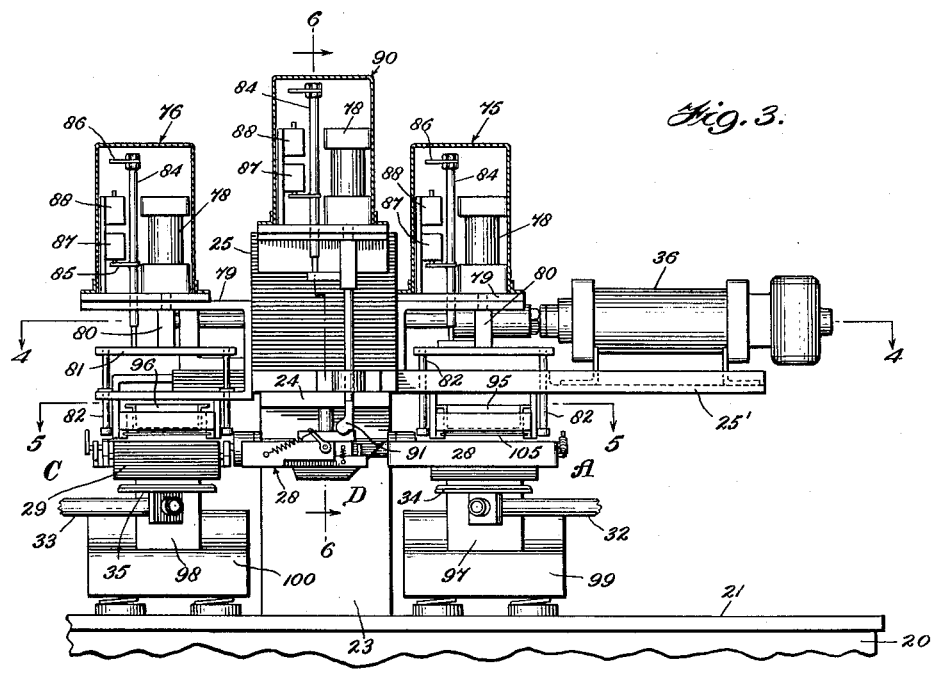
FIG. 3 is a partial front elevation view, partly in section, as seen from the left of FIG. 1.

A plurality of independent weighing mechanisms 30 and 31 are mounted upon the cabinet top 21, as shown in FIGS. 1, 2 and 3. Such mechanisms may be of any kind appropriate to the field in which the apparatus is to be employed, but where the weights involved are of comparatively small magnitude it is desirable in the interests of extreme accuracy that they be of a very sensitive type, such for example as the pneumatic scales here illustrated. Such mechanisms embody beams such as 32 and 33 which may be variably biased for response to any desired weight within their range, to which they react substantially instantaneously. These beams are here shown as provided with platform elements 34 and 35 respectively, disposed slightly below the plane of the bottoms of the batch receptacles 29 and at arcuately spaced points in the orbit of travel of said receptacles about the axis of shaft 26. Such points constitute the stations (designated A and C in the drawings) in the cycle of operation at which the initial and final batch portions respectively are introduced into the receptacles and weighed, and intermediate them are stations B and D at the latter of which the batches are discharged from the receptacles following their completion. In the construction here illustrated the station B is an idle one.

The shaft 26 is intermittently movable in a counterclockwise direction (as viewed in FIG. 2) whereby to sequentially move the several batch receptacles 29 from station to station, such movement being effected by a double-acting reciprocating piston fluid pressure motor 36 which is mounted on an extension 25' of one of the members of the auxiliary frame 25. As best shown in FIGS. 4, 6, 7 and 8, the piston rod 37 of said motor is connected through the medium of a resilient over-travel permitting device 38 to a rack element 39 which meshes with a pinion 40 that is loosely carried by the shaft 26. The said pinion is rigidly connected with the driving member of a one-way clutch 41, the driven member of which is rigidly connected to the shaft 26. Thus, during outward travel of the piston of the motor 36 (i.e., from right to left as viewed in FIGS. 4 and 7) its motion will be transmitted through its piston rod 37, connection 38 and rack 39 to the pinion 40, and thence through clutch 41 to shaft 26 whereby the latter and the parts rigidly carried thereby will be positively moved through an arc of 90° in the counterclockwise direction above mentioned. During retraction of the motor piston the clutch 41 will release and thus the pinion 40 may be rotated in a reverse direction by the rack 39 while the shaft 26 and associated parts remain in the positions to which they have been moved.

Travel of the rack 39 may be adjusted and limited by the stop screws 42 carried by a member of the auxiliary frame 25, such screws being engageable at the respective ends of the rack stroke by an abutment 43 carried by the rack. The resilient device 38 accommodates any discrepancies between the rack stroke and that of the motor piston, as will be readily understood. The piston rod 37 rigidly carries a laterally projecting arm 44 arranged to engage and actuate the frame-mounted micro-switches 45 and 46 at the respective rearward and forward ends of the rod stroke, which switches control the circuits of an electromagnetically actuated valve that controls the fluid pressure supply to and exhaust from said motor to effect operation thereof.

Figure 7:
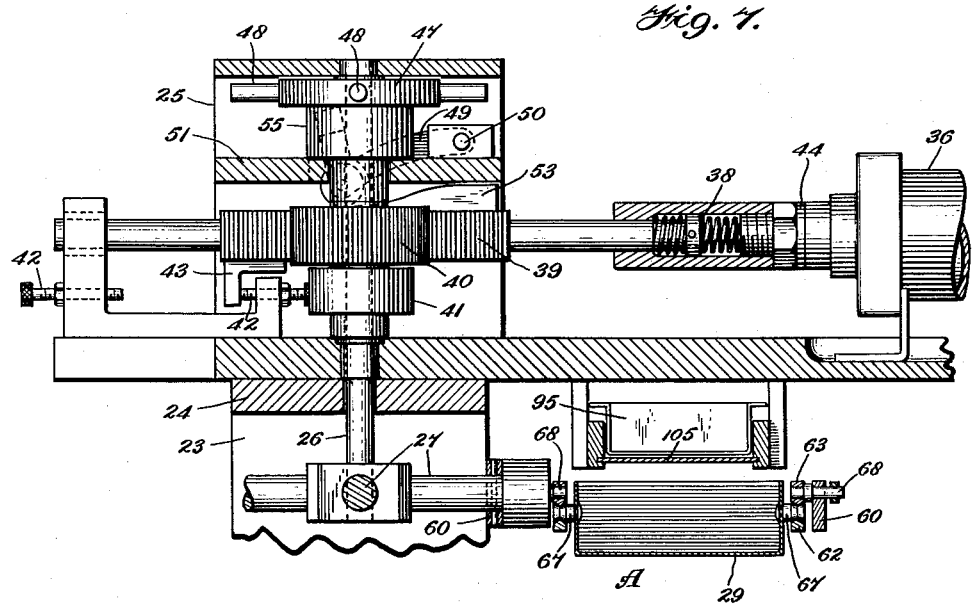
FIG. 7 is an enlarged vertical sectional view on the plane indicated by the line 7—7 in FIG. 6, looking in the direction of the arrows.
Figure 8:
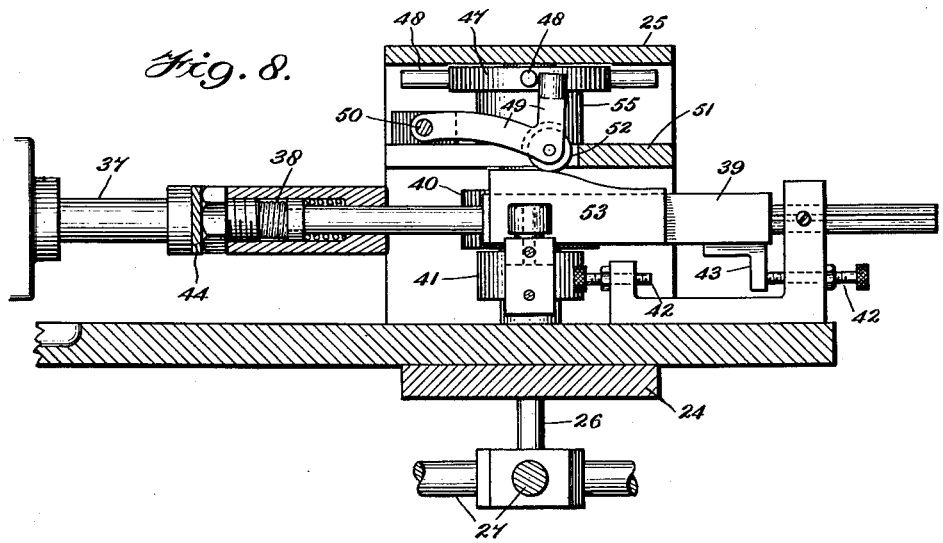
FIG. 8 is a view similar to FIG. 7 but taken on approximately the planes indicated by the line 8—8 in FIG. 6, looking in the direction of the arrows.

In order to insure accurate positioning of the receptacles 29 relative to the scale platforms 34 and 35 an automatic stop device is provided in the upper portion of the auxiliary frame 25, as best shown in FIGS. 6, 7 and 8. This device comprises a disk 47 which is rigidly secured to the upper end portion of the shaft 26 and is provided with a plurality of radially projecting pins 48, equal in number to and correlated with the arms 27 carried by the lower end of said shaft. An L-shaped dog 49 has its longer leg pivotally mounted at 50 on an intermediate member 51 of the auxiliary frame 25, and said dog carries a roller 52 at the juncture of its two legs, which roller rides on a cam 53 that is rigidly carried by the rack 39.

When the rack moves outwardly during a working stroke of the motor piston thereby rotating the shaft 26 and associated parts through the medium of the pinion 40 and clutch 41, the cam 53 will elevate the dog 49 from its FIG. 7 position to that shown in FIG. 8, thus bringing the upper end portion of the shorter leg of the dog into the path of the disk-carried pins 48. The dog is contacted by the approaching pin and arrests motion of the receptacles 29 just as they reach proper positions above the scale platforms 34 and 35, thus preventing over-running of such positions by the receptacles due to momentum of the parts. Upon retraction of the rack its cam 53 permits the dog 49 to return to its FIG. 7 position by gravity, and thus the pin 48 which was engaged with the dog is freed for movement past it upon the next advance of the rack.

The mechanism in the upper portion of the frame 25 also includes means for preventing retrograde or clockwise movement of the shaft 26 and its associated parts. Such means comprises a brake device 55 which conveniently may take the form of a one-way clutch similar to the clutch 41 except that it functions in the opposite direction. In the case of the device 55 however, one of its elements is secured to the shaft 26 while its other element is non-rotatably secured to the frame member 51 and thus, although the device will permit free counterclockwise movement of the shaft 26, it will effectively prevent movement thereof in the opposite direction.

The receptacle carrier assemblies 28 above mentioned each comprise a main supporting member 60 of generally C-shaped formation, one of the legs of which has its free end portion rigidly attached to the mounting arm 27 so that said member extends horizontally outward beyond the end of such arm. Disposed within said main member 60 is a second substantially C-shaped structure 61, each leg of which comprises two complemental superposed elements 62 and 63 which are pivotally connected together at 64. These pairs of elements are normally maintained in a parallel contacting relation (best shown in FIG. 11) by tension springs 65, and the adjoining edge portions of each pair are provided with complemental semi-circular recesses 66 (see FIG. 12) which normally mate to constitute closed apertures for receiving studs 67 which project from opposite side walls of the receptacle 29. At least one of the elements 63 is provided with a lateral extension 63' which is engageable by the upper edge of the adjacent receptacle side wall whereby to prevent swinging of the receptacle about the axis of the studs 67.

This construction enables the carriers to firmly support and retain the receptacles when the parts are in the normal relations shown in FIGS. 10 and 11, which they maintain during translation of the receptacles from one station to another. On the other hand, when a receptacle is brought to position above either of the scale platforms, through separation of the elements 62 and 63 as depicted in FIG. 12, in a manner to be later described, the receptacle will be lowered to and freely rest upon the platform temporarily completely disengaged by the carrier, and thus the weighing operation may be freely and accurately performed.

The inner structure 61 is mounted within the outer member 60 for swinging movements relative thereto about a horizontal axis, the mounting comprising pins 68 carried by the respective elements 63, one of which is journaled in the outward leg of said member 60 and the other of which is journaled in the end of the arm 27 that supports the assembly. The first named pin rigidly carries an arm 69 to which is attached one end of a tension spring 70, the other end of which is anchored at 71 to the member 60. This spring yields during swinging of the structure 61 and receptacle 29 to the FIG. 13 position for discharge of the completed batch, as will presently appear, following which it returns the parts to the normal positions shown in FIG. 10, in which they are retained by spring catch 72, see FIG. 5.

Mechanisms 75 and 76 are provided at the respective material feeding and weighing stations A and C for actuating the carrier elements 62 whereby to temporarily release the receptacles 29 from the carriers to the scale platforms for weighing purposes. Although these mechanisms 75 and 76 differ slightly in minor particulars they are essentially duplicates and function in the same manner, and therefore the following description applies equally well to both.

As will be best understood from FIGS. 3 and 12, they each comprise a vertically disposed double-acting reciprocating-piston fluid pressure motor 78 fixedly mounted on a bracket 79 carried by the auxiliary frame 25, to the piston rod 80 of which motor there is secured a cross-bar 81 from which depends a pair of spaced rods 82 having their lower ends disposed above and in position to contact the upwardly extending pins 83 carried by the free end portions of the elements 62 of the receptacle carriers 28. A rod 84 mounted by and extending upwardly from the cross-bar 81 carries a pair of vertically spaced laterally projecting fingers 85 and 86 which are arranged to alternatively engage and actuate micro-switches 87 and 88 respectively, which are also supported by the bracket 79. The said switches control electric circuits that include electromagnetically operable valves which govern supply and exhaust of fluid pressure to and from the cylinder of the motor 78 whereby to secure the desired movements of the motor piston.

As previously indicated, the carrier parts normally occupy the positions illustrated in FIGS. 10 and 11 but when the motors 78 are actuated upon arrival of each carrier at stations A and C to depress the cross-bars 81 and rods 82, the latter contact the pins 83 of the carrier elements 62 and swing such elements downwardly on pivots 64 against the tension of the springs 65, thus separating said elements from their companion elements 63, as shown in FIG. 12. This lowers the receptacles 29 into engagement with the scale platforms 34 and 35 and completely disengages them from the carriers during the material feeding and weighing operation. At the conclusion of this, the motors 78 are actuated in the opposite direction to lift the rods 82, thus permitting the springs 65 to restore the carrier parts to their normal positions thereby raising the partly and fully loaded receptacles clear of the weighing mechanisms for transfer to the next station.

At the station D there is provided a mechanism 90 embodying components and arrangements thereof similar to the mechanisms 75 and 76 except that in this instance a single rod 91 extends downwardly from the piston rod of the motor. As will be clear from FIGS. 1 and 3, the lower end of this rod is so disposed as to aline with the inward leg element 63 of the carrier structure 61 when they are positioned at this station, and upon actuation of motor 78 of mechanism 90 the said rod will engage the forward end portion of such element and swing the entire carrier structure 61 and its receptacle 29 about the axis of the mounting pins 68, against the action of the spring 70. This brings the parts to the positions shown in FIG. 13, in which the completed batch of material will be gravitationally discharged from the receptacle, following which restoration of the rod 91 to its upward position by the motor 78 permits the spring 70 to restore the carrier parts and receptacle to the FIG. 10 positions.

The means for feeding the material components to the receptacles 29 when they are positioned on the respective scale platforms at the stations A and C comprise substantially horizontal troughs 95 and 96 the rearward portions of which are carried by supports 97 and 98 that extend upwardly from housings 99 and 100. These housings are resiliently mounted on the cabinet top 21 and enclose electromagnetic mechanisms (diagrammatically indicated at 101 and 102 in FIG. 15) whereby the troughs are vibrated to effect movement of their contents to their forward ends, which are located above the respective scale platforms 34 and 35. The materials are continuously or intermittently supplied to the troughs from appropriate sources of supply, not shown.

Reciprocating cut-off plates 105 and 106 are slidably mounted beneath said forward trough ends and are respectively operable by fluid pressure motors 107 and 108 through connections 109 and 110. The movements of these motors are controlled by the respective weighing mechanisms 30 and 31, and the plates or slides 105 and 106 effect complete interruption of the material feeds substantially simultaneously with the attainment of the desired weight of material in the respective receptacles 29 as determined by said weighing mechanisms. Vibration of the troughs 95 and 96 by their mechanisms 101 and 102 is also interrupted simultaneously with actuation of the cut-off plates and the action of the latter is so rapid and effective that no appreciable amount of material is deposited in the receptacles after the scale bias is overcome. Thus, extreme accuracy in the batch weights may be consistently maintained without underbiasing of the weighing mechanisms, which is an expedient heretofore commonly practiced in an effort to compensate for material in transit between the feeder and the receptacle at the time the scale bias is overcome.

Figure 15:
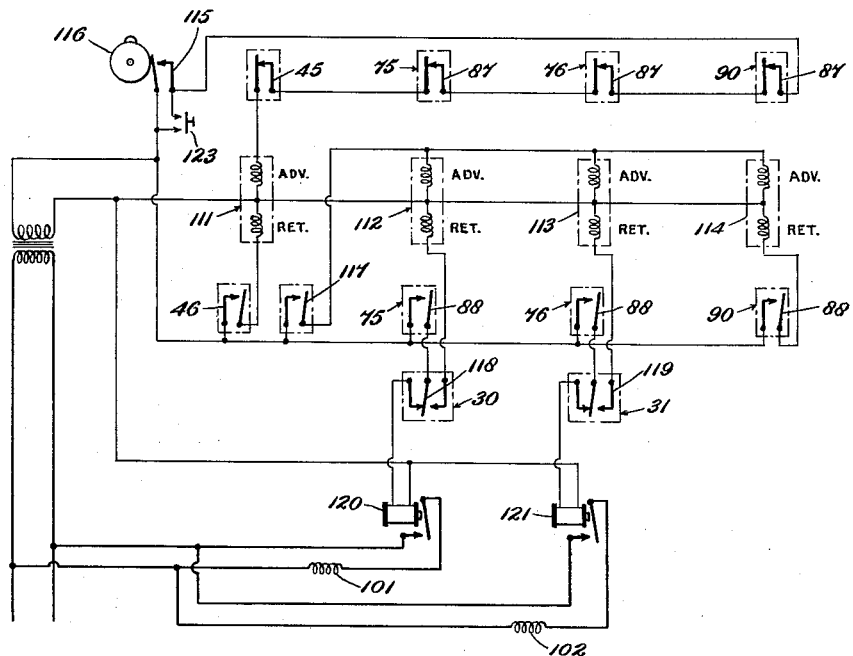
FIG. 15 is a diagrammatic illustration of the principal electrical circuits of the apparatus.
Figure 16:
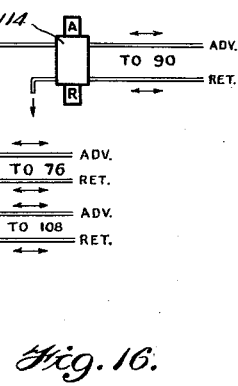
FIG. 16 is a diagrammatic representation of portions of the fluid circuits and their controlling valves.

The principal portions of the electrical and fluid-pressure circuits of the apparatus are illustrated diagrammatically in FIGS. 15 and 16. As will be readily understood therefrom, electromagnetically actuated valves 111, 112, 113 and 114 are arranged to control the fluid circuits of the several motors 36, 78, 107 and 108 whereby to cause alternate advancement and retraction of the parts operated by said motors. The valve 111 controls the indexing motor 36; the valve 112 controls the receptacle-release motor 78 of the mechanism 75, and also the cut-off slide motor 107; the valve 113 controls the receptacle-release motor 78 of the mechanism 76, and also the cut-off slide motor 108; and the valve 114 controls the motor 78 of mechanism 90 which effects discharge of the completed batches from the receptacles 29. FIG. 16 also indicates fluid pressure supply lines to the respective weighing mechanisms 30 and 31.

As shown in FIG. 15, energization of the magnet of the valve 111 that shifts said valve to the position in which the motor 36 is caused to advance the rack 39 and move the several receptacles 29 from one station to the next, is controlled by the switch 45 which at the beginning of a cycle is held in closed position by the piston rod arm 44. This switch and the several switches 87 of the mechanisms 75, 76 and 90 are connected in series with one another and with a switch 115 that is arranged to be intermittently closed by a cam 116 each time a container or package is moved into position at station D to receive a batch from a receptacle 29. This series arrangement of the several switches makes it impossible for a cycle of the apparatus to be started if the motor 36 or any of the mechanisms 75, 76 and 90 are not in their normal or retracted positions, as the switch 45 and all of the switches must be closed in order for the advancing circuit of motor 36 to be energized through closing of the switch 115.

Retraction of the rack 39 by motor 36 is effected by the closing of switch 46 by the arm 44 at the end of the forward or advance movement of said motor and rack. At the same time said arm also closes an impulse switch 117 which controls the circuits of the "advance" magnets of the valves 112, 113 and 114, and thus the several motors 78 are caused to advance the parts actuated thereby. As will be understood from FIG. 16 however, the motors 107 and 108 are so connected to the fluid conduits as to retract the cut-off slides 105 and 106 as the motors 78 advance their instrumentalities, and vice versa. The "retraction" magnets of the valves 112, 113 and 114 are respectively controlled by the switches 88 of the mechanisms 75, 76 and 90, which in the case of valves 112 and 113 are connected in series with switches 118 and 119 that are actuated by the weighing mechanisms 30 and 31.

The said switches 118 and 119 are of the double-throw type and in the unbalanced condition of the scales 30 and 31 are positioned to close circuits through the coils of relays 120 and 121 respectively which control secondary circuits that include the electromagnetic trough vibrating devices 101 and 102. So long as the switches 88 of the mechanisms 75 and 76 are open the said relays are de-energized and the trough vibrating devices are inoperative; however, when such switches are closed due to "advance" movement of the motors 78 of said mechanisms in response to closing of the switch 117, the coil circuits of the relays are completed, thereby closing the secondary relay circuits and actuating the vibrating devices.

When the material deposited in the receptacles 29 by the troughs 95 and 96 overcomes the bias of the respective scales 30 and 31, the switches 118 and 119 are shifted to their other position thereby, thus breaking the relay coil circuits with resultant opening of their secondary circuits and stoppage of operation of the trough vibrators 101 and 102. Said movement of the switches 118 and 119 to their alternate position also closes the circuit through the retraction magnets of the valves 112 and 113, and thus the motors 78 of the mechanisms 75 and 76 and the parts actuated thereby are restored to their normal positions.

Since the motors 107 and 108 which actuate the cut-off slides 105 and 106 are also controlled by the valves 112 and 113, the movements of the switches 88, 118 and 119 just described also result in the retraction and advancement of the said slides simultaneously with the starting and stopping of the trough vibrators 101 and 102.

The "retraction" magnet of valve 114 controlling the discharge mechanism at station D is energized solely through the closing switch 88 in the mechanism 90 due to "advance" movement of its motor 78, but as will be clear from the above energization of the "retraction" magnets of the valves 112 and 113 is delayed until the respective scales 30 and 31 shift their switches 118 and 119 to the alternate position of that shown in FIG. 15. Since the switches 87 of the respective mechanisms 75, 76 and 90 are opened when their motors move to "advance" position and remain open until such motors are returned to their normal position through energization of the "retraction" magnets of their respective valves 112, 113 and 114, and since as above explained a cycle of operation cannot be initiated unless all of the switches 87 are closed, it is obvious that a new cycle cannot be started until the scales 30 and 31 have actuated their switches 118 and 119 upon attainment of the weight of material in the receptacles necessary to complete the first batch.

A manually operable switch 123 may be connected in parallel with the cam actuated switch 115, whereby a cycle of the apparatus may be initiated independently of said switch 115 at the beginning of operations or following a shut-down.

As a positive guard against retrograde movement of the carriers 28 and receptacles 29 when they are positioned at the several stations, a vertically disposed fluid pressure motor 125 may be mounted on the frame member 24 at the station B, as shown in FIGS. 1, 2, 4 and 6. This motor may be controlled by either of the valves 112 and 113 and when it is "advanced" its piston rod 126 is projected downwardly from the position shown in FIG. 6 into the path of the carriers 28 and engages the rearward face of the element 60 of the carrier which at that time is positioned at said station B (see FIG. 5). Counterclockwise movement of the carriers and receptacles is thus positively prevented until the material feeding operation is completed, at which time the motor 125 withdraws the rod 126 upwardly out of the path of the succeeding carrier.

Figure 4:
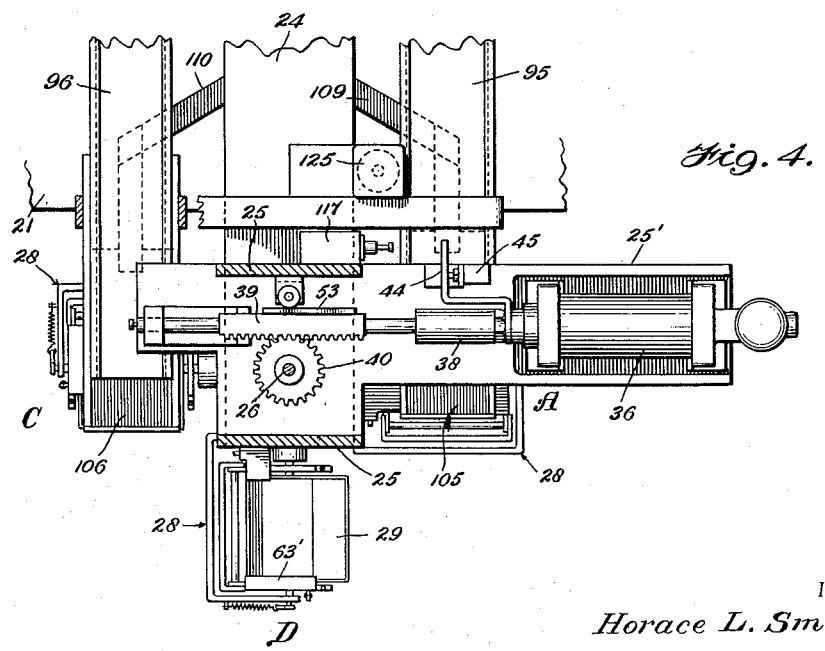
FIG. 4 is a partial horizontal sectional view on approximately the plane indicated by the line 4—4 in FIG. 3, looking down.

Assuming that the larger material components (or a mixture of all components) are being supplied to the trough 95, and only the smaller components to the trough 96; that the weighing mechanism 30 is biased to react to say 90% of the full batch weight, and the mechanism 31 to the full batch weight (both plus the tare of the receptacles); that the motors 36, 78 and 125 are all in their retracted positions while the motors 107 and 108 are in their advanced positions; and that the electrical circuits are in the condition shown in FIG. 15: closing of the switch 115 by the cam 116 will result in the following cycle of operation:

Since the switch 45 is closed by the arm 44 of motor 36, and all of the switches 87 are closed by the fingers 85 of the motors 78 of the respective mechanisms 75, 76 and 90, the closing of the switch 115 will cause shifting of the valve 111 to "advance" position with resultant actuation of the motor 36 to move the rack 39 outwardly, or toward the left as viewed in FIGS. 4 and 7. Such rack movement is transmitted through gear 40 and clutch 41 to shaft 26, thereby indexing the several carriers 28 and receptacles 29 from one station to the next in the previously mentioned counterclockwise direction. The said rack advancement also causes the cam 53 to lift the L-shaped dog 49 to its FIG. 8 position and as the several receptacles reach the stations toward which they are being moved, one of the pins 48 of the shaft-carried disk 47 engages the upwardly extending leg of said dog, thus stopping the arcuate movement of the parts with the receptacles accurately positioned at the respective stations. Should this stoppage occur slightly before the rack reaches its outward limit of movement, the over-travel device 38 will yield and prevent damage to the parts; and any tendency of the parts to rebound from their stopped positions will be checked by the brake device 55.

As the motor 36 and rack 39 begin their outward travel the arm 44 carried by the piston rod 37 of said motor disengages the switch 45, thereby opening said switch and breaking the "advance" coil circuit of the valve 111 which valve however, remains in "advance" position until its other magnet coil is energized. This occurs when the rack 39 reaches it outward limit of movement at which point the arm 44 engages with and closes the switches 46 and 117, the former of which controls said other coil. The motor 36 and rack 39 are thus retracted to their initial positions as a result of the closing of switch 46, during which movement the clutch 41 disengages so that said rack movement will not be transmitted to the shaft 26; and retrograde movement of said shaft and the parts carried thereby is prevented by the brake device 55. The retraction of the cam 53 carried by the rack lowers the dog 49 and frees the stop pin 48 which had been engaged therewith.

The retraction of the indexing motor 36 also re-opens the switches 46 and 117, and again closes the switch 45; however, by this time cam 116 has re-opened switch 115 and thus the valve 111 will remain in "retract" position until said switch 115 again closes its circuit at the beginning of a new cycle. Furthermore, the closing of switch 117 has energized the "advance" magnets of the several valves 112, 113 and 114 with resultant advancement of the respective motor 78 controlled thereby, which advancement among other things causes the fingers 85 of the respective mechanisms 75, 76 and 90 to open the switches 87 thereof and the fingers 86 to close their switches 88. Since as above explained, the switches 87 are in series with the switches 45 and 115, the motor 36 can not be again actuated to begin a new cycle of the apparatus until all of the mechanisms at stations A, C and D have completed their functions and the respective motors 78 thereof been restored to their retracted positions.

Advancement of the motors 78 of the mechanisms 75 and 76 forces the rods 82 thereof downwardly into engagement with the pins 83 of the carriers 28 at stations A and C, thereby moving the carrier parts to the positions shown in FIG. 12. This lowers their receptacles 29 onto the scale platforms 34 and 35, and disengages the studs 67 from their mounting recesses 66, thus temporarily completely freeing said receptacles from their carriers whereby to enable accurate weighing of the materials introduced into the receptacles. At the same time the motor 78 of mechanism 90 forces its rod 91 downwardly into engagement with the element 63 of the carrier positioned at station D, thus tilting the carrier structure 61 and the receptacle carried thereby to the batch discharging position illustrated in FIG. 13.

Concomitantly with these actions the motors 107 and 108 have been retracted to withdraw the cut-off plates or slides 105 and 106 from their forward or material-intercepting positions, as shown in FIG. 5; and the closing of the switches 88 of the mechanisms 75 and 76 has completed the primary circuits of the relays 120 and 121, thereby closing their secondary circuits with resultant actuation of the trough vibrating devices 101 and 102.

Closing of the switch 88 of the mechanism 90 at the discharge station D directly energizes the retraction magnet of valve 114 and thus the rod 91 and elements of said mechanism 90 are promptly restored to their initial or retracted positions, permitting the spring 79 to return the receptacle to horizontal position. The mechanisms at stations A and C however, remain in their advanced positions until material components sufficient to overcome the biases of the respective scale mechanisms 30 and 31 have been deposited from the feeding troughs 95 and 96 into the receptacles resting upon the scale platforms 34 and 35. When this point is reached (which may or may not be simultaneously as regards the two mechanisms) the scales independently move the switches 118 and 119 to break the primary circuits of the relays 120 and 121 and thus stop actuation of the trough vibrating devices 101 and 102. The shifting of the scale switches 118 and 119 also closes the retraction magnet circuits of the valves 112 and 113, with resultant actuation of such valves to cause advancement of the cut-off slides 105 and 106 by their motors 107 and 108 to their forward material-intercepting positions, as well as restoration of the elements of the mechanisms 75 and 76 to their normal positions.

The lifting of the rods 82 during this phase of the operation of course permits the springs 65 of the carriers 28 to restore the members 61 thereof to their FIG. 11 position, thereby re-engaging the receptacle studs 67 in the recesses 66 and elevating the receptacles and their contents from the scale platforms 34 and 35 for translation to the next station as a part of the succeeding cycle. Upon such removal of the receptacles from said platforms the scales return their respective switches 118 and 119 to their FIG. 15 position, and in the meantime the retractive movements of the mechanisms 75 and 76 have caused the fingers 86 and 85 thereof to respectively open their switches 88 and close the switches 87. The various instrumentalities are now all in position for the initiation of another cycle by the closing of the switch 115.

What is claimed is:

1. In apparatus for providing consistently accurate predetermined net-weight batches of solids components of non-uniform size preparatory to the deposit of such batches into final containers, the combination of a plurality of spaced immobile weighing mechanisms; a receptacle for receiving and retaining successive batches of said components during the weighing thereof only; means releasably supporting said receptacle and mounting it for movement between the respective weighing mechanisms; means for intermittently moving said supporting means to correlate the receptacle with said weighing mechanisms in sequence; means operable when the receptacle is so correlated with each weighing mechanism to release it from the supporting means for free engagement with such mechanism, and to re-engage it with the supporting means at the conclusion of the functioning of said weighing mechanism; means arranged to supply material components to said receptacle when it is engaged with one of the weighing mechanisms until a fraction of the total batch, as determined by such mechanism, has been deposited in the receptacle; means arranged to supply material components to the partially filled receptacle when it is engaged with another weighing mechanism until a further portion of the batch, as determined by such weighing mechanism, has been deposited; and means for discharging the completed batches from the receptacle.

2. In apparatus for providing consistently accurate predetermined-weight batches of discrete non-uniform solids components preliminary to the deposit thereof into final containers, the combination of a plurality of fixed independent weighing mechanisms disposed at spaced stations; a plurality of batch receptacles adapted to receive and hold successive batches of said components during the weighing thereof only; carrier means releasably supporting the several receptacles normally out of engagement with said weighing mechanisms and mounting them for serial movement between said stations; means for intermittently repetitiously moving said carriers and receptacles from station to station; means for temporarily releasing the receptacles from said carrier means at the respective weighing stations for free engagement with the weighing mechanism thereat; means at each station for supplying the solids components to the receptacles while so released from the carrier means; means controlled by the respective weighing mechanisms for instantly interrupting the component supply at their station upon the deposit in the receptacle thereat of a predetermined portion of a batch; and means for effecting discharge of the batches from the receptacles upon completion.

3. Apparatus according to claim 2, wherein each batch receptacle is tiltably carried by the carrier means, and the means for discharging the batches from the receptacles comprise instrumentalities arranged to engage with and tilt the receptacles, whereby the batches may be gravitationally discharged therefrom.

4. Apparatus according to claim 2, wherein means are provided for positively preventing displacement of the carrier means and receptacles from the respective stations during the weighing operation.

5. In apparatus for providing consistently accurate predetermined-weight batches of discrete non-uniform solids components preliminary to the deposit of such batches into final containers, the combination of a plurality of independent weighing mechanisms fixedly disposed at spaced stations; a plurality of batch receptacles for receiving and holding successive batches of said components during the weighing thereof only; carrier means releasably supporting the several receptacles in spaced relation to one another and mounting them for serial movement between said stations; intermittently operable means for positively unidirectionally moving said carrier means and receptacles from station to station; means for temporarily releasing the receptacles from said carrier means at the respective weighing stations for free engagement with the weighing mechanism thereat; means at each such station for supplying the solids components to the receptacles while so released from the carrier means; means controlled by the respective weighing mechanisms for instantly interrupting the component supply at their station upon deposit in the receptacle thereat of a predetermined portion of a batch; means for positively preventing retrograde movement of the carrier means and receptacles from the respective stations during the weighing operations; and means for effecting discharge of the completed batches from the receptacles.

6. In apparatus for providing consistently accurate predetermined-weight batches of discrete non-uniform solids components, the combination of a plurality of independent weighing mechanisms disposed at spaced stations and each provided with an element adapted to receive and support a receptacle; a plurality of batch receptacles; carrier means releasably supporting the several receptacles and mounting them for serial movement between said stations to positions above said receiving elements; means for intermittently moving said carriers and receptacles from station to station; means for lowering the receptacles onto said receiving elements at the respective stations and temporarily completely releasing them from the carriers; means at each of said stations for supplying the solids components to the receptacles while so freely resting upon said receiving elements; and means controlled by the respective weighing mechanisms for instantly interrupting the component supply at their station upon deposit in the receptacle thereat of a determined fractional portion of a batch, and concomitantly re-engaging the receptacle with its carrier; said carrier means effecting removal of the receptacle from the weighing station thereafter.

7. In apparatus for providing consistently accurate predetermined-weight batches of discrete non-uniform solids components, the combination of a plurality of independent weighing mechanisms disposed at arcuately spaced stations; a plurality of batch receptacles; rotatably mounted carrier means releasably supporting the several receptacles and mounting them for serial movement between said stations; means for intermittently arcuately moving said carriers and receptacles from station to station; means for temporarily releasing the receptacles from said carrier means at the respective weighing stations for free engagement with the weighing mechanism thereat; means at each such station for supplying certain of the solids components to the receptacles while so engaged with the weighing mechanisms; means controlled by the respective weighing mechanisms for instantly interrupting the component supply at their station upon the deposit in the receptacle thereat of a predetermined fractional portion of a batch; and means disposed at a station arcuately spaced beyond that at which the final batch portion is deposited, for effecting discharge of the batches from the receptacles.

8. In apparatus for providing consistently accurate predetermined-weight batches of discrete non-uniform solids components, the combination of a plurality of independent weighing mechanisms disposed at spaced stations; a plurality of batch receptacles; carrier means releasably supporting the several receptacles in spaced relation to one another and mounting them for serial movement between said stations; means for intermittently moving said carrier means and receptacles from station to station; means for temporarily releasing the receptacles from said carrier means at the respective weighing stations for free engagement with the weighing mechanism thereat; means at each such station for supplying the solids components to the receptacles while so released from the carrier means; means controlled by the respective weighing mechanism for instantly interrupting the component supply at their station upon the deposit in the receptacle thereat of a predetermined portion of a batch; means for effecting discharge of the batches from the receptacles upon completion; motive means for actuating said carrier-moving means, said receptacle-releasing means and said discharge-effecting means respectively; and means controlling said motive means arranged to effect cyclic operation of the instrumentalities operated thereby.

9. Apparatus according to claim 8, wherein the motive controlling means is also arranged to prevent initiation of a cycle of operation until all of the instrumentalities have completed their functions in a preceding cycle.

10. In apparatus for providing consistently accurate predetermined-weight batches of discrete non-uniform solids components, the combination of a plurality of independent weighing mechanisms disposed at spaced stations and each provided with an element adapted to receive and support a receptacle; a plurality of batch receptacles; carrier means independently releasably supporting the several receptacles in spaced relation to one another and mounting them for serial movement between said stations; means for intermittently moving said carrier means and receptacles from station to station; means for positively stopping such movement when the receptacles are accurately positioned relative to said receiving elements of the respective weighing mechanisms; means for lowering the so-positioned receptacles onto such receiving elements and temporarily completely releasing them from said carrier means; means at each of said stations for supplying the solids components to the receptacles while they are freely resting upon said receiving elements; means controlled by the respective weighing mechanisms for substantially instantaneously interrupting the component supply at their station upon deposit in the receptacle thereat of a determined fractional portion of a batch, and concomitantly reengaging the receptacle with its carrier means; and means for effecting discharge of the completed batches from the receptacles.

11. In apparatus for providing consistently accurate predetermined-weight batches of discrete non-uniform solids components, the combination of a plurality of independent weighing mechanisms disposed at spaced stations; a plurality of batch receptacles; carrier means releasably supporting the several receptacles in spaced relation to one another and mounting them for serial movement between said stations; intermittently operable means for moving said carrier means and receptacles from station to station; means controlled by said carrier moving means and operable at the conclusion of the functioning thereof to alternately release the receptacles from and reengage them with the carrier means for temporary free engagement with the weighing mechanisms at the respective stations; means at each such station for supplying certain of the solids components to the receptacles while so released; means controlled by the respective weighing mechanisms for instantly interrupting the component supply at their station upon deposit in a receptacle thereat of a determined fractional portion of a batch; and means operable simultaneously with the receptacle releasing means to effect discharge of a completed batch from a receptacle at another station.

12. In apparatus for providing consistently accurate predetermined-weight batches of discrete non-uniform solids components, the combination of a plurality of independent weighing mechanisms disposed at spaced stations; a plurality of batch receptacles; carrier means releasably supporting the several receptacles in spaced relation to one another and mounting them for serial movement between said stations; motive means connected to said carrier means and operable to intermittently advance the receptacles from station to station; reversible motive means at each of said stations operable in one direction to effect release of receptacles positioned thereat from the carrier means, and in a reverse direction to effect their re-engagement with such means whereby the receptacles may temporarily freely engage the respective weighing mechanisms; means at each of said stations for supplying certain of the solids components to the receptacles while so released from the carrier means; means controlled by the respective weighing mechanisms for effecting instant interruption of the component supply at their station upon deposit in a receptacle thereat of a determined fractional portion of a batch; motive means at another station operable to effect discharge of the completed batches from the receptacles; and means for controlling each of said motive means and arranged to initially activate the carrier advancing means and to subsequently activate the receptacle-release means and the batch-discharge means.

13. Apparatus according to claim 12, wherein actuation of each receptacle-release motive means in its reverse direction to effect re-engagement of the receptacles with the carrier means is controlled by the weighing mechanism at the station concomitantly with interruption of the component supply at such station.

14. In apparatus for providing consistently accurate predetermined-weight batches of discrete non-uniform solids components, the combination of a plurality of independent weighing mechanisms disposed at spaced stations; a plurality of batch receptacles; carrier means releasably supporting the several receptacles in spaced relation to one another and mounting them for serial movement between said stations; fluid-pressure actuated means connected with said carrier means and operable to intermittently advance such means and the receptacles from station to station; fluid-pressure actuated means arranged to effect alternate release of the receptacles from and their re-engagement with said carrier means at the respective weighing stations, whereby the receptacles may temporarily freely engage with said weighing mechanisms; means at each of said stations for supplying certain of the solids components to the receptacles while so released from the carrier means; means controlled by the respective weighing mechanisms for effecting instant interruption of the component supply at their station upon deposit in a receptacle thereat of a determined fractional portion of a batch; fluid-pressure actuated means arranged to effect discharge of a completed batch from a receptacle at another station; and electrically actuated valve means controlling the respectively fluid-pressure actuated means and arranged to initially activate the carrier moving means and to subsequently activate the receptacle-release means and the batch-discharge means.

15. Apparatus for batch-weighing fluent materials, comprising a weighing mechanism; a batch receptacle; horizontally rotatable carrier means including separable elements normally engaging and supporting said receptacle; resilient means arranged to normally maintain said separable carrier elements in closed, receptacle-supporting relation; means for intermittently moving said carrier means whereby to bodily move the receptacle to and from a position adjacent said weighing mechanism; means arranged to temporarily separate said carrier elements against the action of said resilient means when the receptacle is in such position, whereby to release it for free engagement with the weighing mechanism; and means for supplying the material to the receptacle when so engaged with said weighing mechanism.

16. Apparatus for batch-weighing fluent materials, comprising a weighing mechanism; a batch receptacle; horizontally rotatable carrier means tiltably supporting said receptacle and having separable elements releasably engaging the latter; resilient means connecting said separable carrier elements and normally maintaining them in closed, receptacle-supporting relation; means for intermittently moving said carrier means whereby to serially move the receptacle to a plurality of stations at one of which it is adjacent said weighing mechanism; means at such weighing station arranged to engage and separate said carrier elements against the action of said resilient means when the receptacle is at such station, whereby to completely release it from the carrier means for free engagement with the weighing mechanism; means for supplying the material to the receptacle when so engaged with the weighing mechanism; and means at another of said stations arranged to tilt said receptacle when it is disposed at such other station, whereby to effect discharge of the batch from the receptacle.

17. Apparatus for batch-weighing fluent materials, comprising a weighing mechanism; a batch receptacle; horizontally rotatable carrier means including separable elements normally engaging and supporting said receptacle; means for intermittently moving said carrier means whereby to bodily move the receptacle to and from a position above said weighing mechanism; reciprocating means arranged to engage said carrier elements when the receptacle is in such position and sequentially open and close them, whereby to temporarily lower the receptacle into engagement with the weighing mechanism and completely release it from the carrier means; and means for supplying the material to the receptacle while it is so released.

References Cited in the file of this patent

UNITED STATES PATENTS

| | | |
|---|---|---|
| 1,300,274 | Jefferies | Apr. 15, 1919 |
| 1,425,251 | Gwinn | Aug. 8, 1922 |
| 2,076,617 | Cleaves | Apr. 13, 1937 |
| 2,503,295 | Palmer | Apr. 11, 1950 |
| 2,565,792 | Wagner et al. | Aug. 28, 1951 |
| 2,590,704 | Howard | Mar. 25, 1952 |
| 2,726,061 | Schieser et al. | Dec. 6, 1955 |